V. GAZZOLO.
AUTOMATIC FEEDING GREASE CUP.
APPLICATION FILED SEPT. 29, 1913.
1,115,658.
Patented Nov. 3, 1914.
2 SHEETS—SHEET 2.
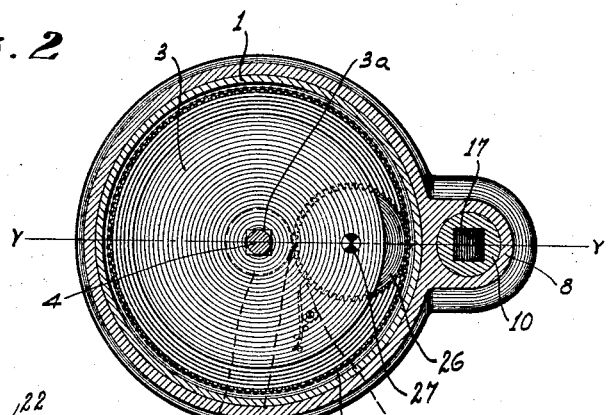
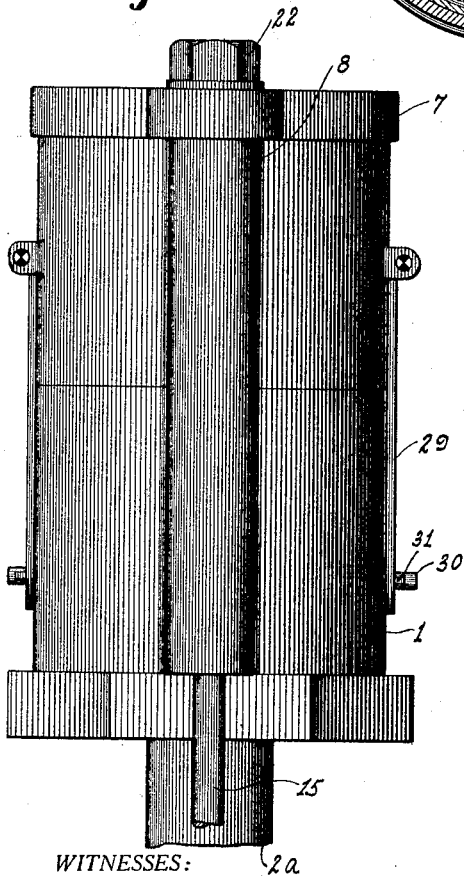
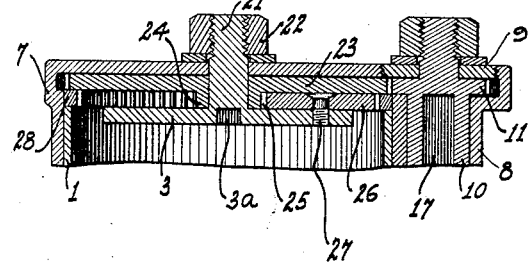
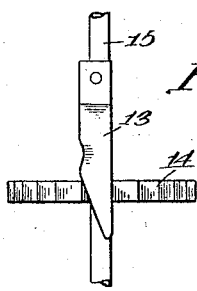
WITNESSES:
Clarence M. Smith
J. B. Webster
INVENTOR.
Victor Gazzolo
BY
ATTORNEYS.

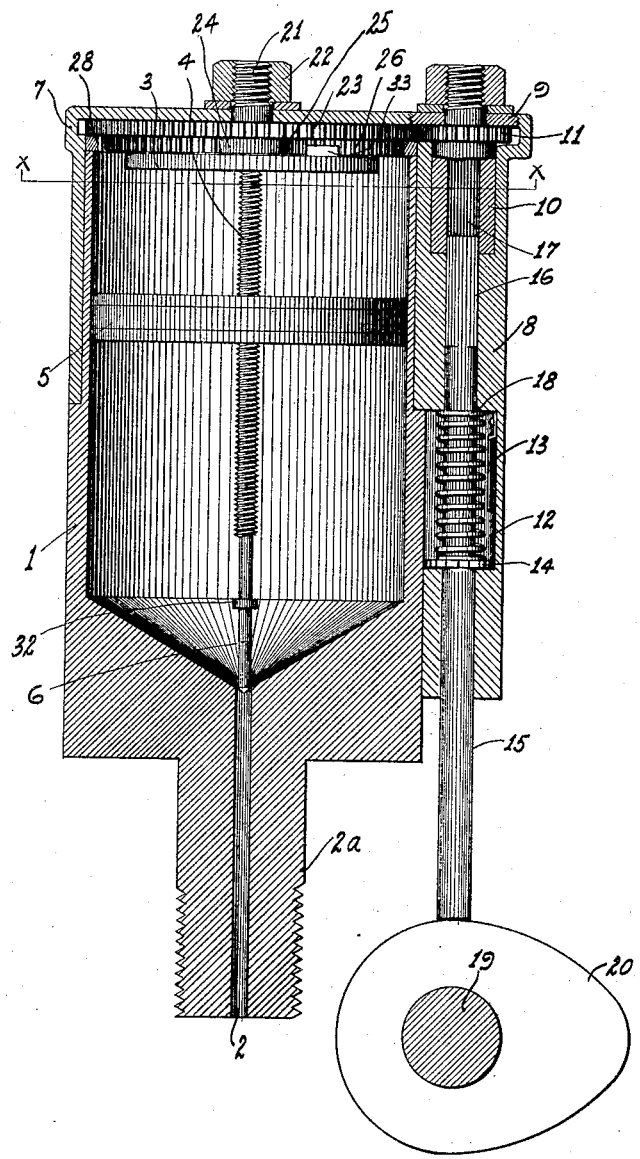

UNITED STATES PATENT OFFICE.

VICTOR GAZZOLO, OF STOCKTON, CALIFORNIA.

AUTOMATIC-FEEDING GREASE-CUP.

1,115,658.            Specification of Letters Patent.        Patented Nov. 3, 1914.

Application filed September 29, 1913. Serial No. 792,328.

*To all whom it may concern:*

Be it known that I, VICTOR GAZZOLO, a citizen of the United States, residing at Stockton, in the county of San Joaquin, State of California, have invented certain new and useful Improvements in Automatic-Feeding Grease-Cups; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in grease cups used for feeding lubricating material to such as journals, bearings and other machinery parts, the present illustrated invention being particularly adapted for use in connection with locomotives and other similar machinery, the object of the invention being to produce a grease cup by means of which the lubricant will be automatically fed to the parts to be lubricated in the exact proportions required for perfect lubrication.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a sectional view of the grease cup. Fig. 2 is a sectional view taken on a line X—X of Fig. 1. Fig. 3 is a sectional view of the upper portion of the grease cup taken relatively on a line Y—Y of Fig. 2. Fig. 4 is a side elevation of the grease cup. Fig. 5 is a side elevation of the operating ratchet wheel and the finger member for turning the same.

Referring now more particularly to the characters of reference on the drawings, the numeral 1 designates the grease cup proper which has a substantially conical shaped bottom communicating with the outlet or passageway 2 which projects through the lower stem 2$^a$ which is threaded to receive connection with any suitable part desired.

The numeral 3 designates a disk provided with a square recess 3$^a$ into which fits the square head of a threaded pin 4 mounted on which is a piston or reciprocating member 5 fitting closely into the cup 1. The lower end of the pin 4, as at 6, is tapered and fits directly over the outlet passageway 2 whereby with the turning of the pin 4, it will keep such passageway 2 clear.

The numeral 7 designates the cover for the grease cup which fits part way over the top of the cup and is provided on one side with an outwardly and downwardly projecting sleeve 8. In the top of the cover 7 is a removable screw block 9 for the purpose of admitting into the upper part of the sleeve 8 a sleeve 10 having as a component part thereof a pinion gear 11.

In the side of the sleeve 8 is a recess 12 having a tapered projecting finger member 13 adapted to engage a ratchet wheel 14 on a pin 15, which pin 15 projects through the sleeve 8 and has a square head 16 fitting into a square slot 17 in the sleeve 10. A spring 18 is interposed between the top of the recess 12 and the ratchet wheel 14 for the purpose of maintaining the pin 15 in its lowest position.

The numeral 19 designates a shaft adapted to be operated by any part of the machinery to which the grease cup is attached and carries a cam 20 engaging the pin 15 for the purpose of raising and lowering said pin through said sleeve 8. Of course, instead of this cam 20 any other suitable mechanical movement can be used for the purpose of operating the pin 15, hence I lay no particular claim to the use of the cam alone.

On the disk 3 is an upwardly projecting pin 21 which projects through the top of the cover 7 and is threaded to receive a nut 22 which holds the disk 3 in normal position. In this normal position a pinion 23 is turnably mounted around the pin 21 between the disk 3 and the top of the cover 7 and engages the pinion 11. This pinion 23 has a downwardly projecting sleeve 24 provided with one pinion tooth 25 adapted to engage a pinion to be turnably mounted on a pin 27 on the disk 3. The pinion 26 intermeshes with a gear rack or ring 28 secured to the inside of the cover 7 just above the top edge of the grease cup 1.

When the grease is to be filled into the cup 1, the cover 7 is removed which carries with it the sleeve 8 and all its geared parts and also the disk and gear mechanism above described mounted in said cover 7 leaving the pin 4 and the piston 5 within the cup 1. These are then removed and the grease filled into the cup and the pin 4 and piston 5 then inserted in the cup and the cover placed over the same, the recess 3ᵃ then receiving the square head of the pin 4. Then with the operation of the machine to which the grease cup is attached, the movement of the cam 20 or other connection intermittently drives the pin 15 upwardly. With its upward movement, this pin 15 carries the ratchet wheel 14 into engagement with the tapered finger member 13, the engagement of which finger member on the ratchet member moves the pin 15 a part of a turn around. This motion is accomplished by reason of the tapered finger member engaging one of the ratchet teeth of the wheel 14 with the upward movement of such wheel with the pin 15, such engaging position being shown in detail in Fig. 5. This action is then transmitted by the square head 16 to the sleeve 10 causing such sleeve 10 and incidentally the pinion 11 to turn. This pinion 11 then turns the pinion 23 which in turn actuates the sleeve 24 to cause the tooth 25 to turn the pinion 26. Then since said pinion 26 is turnable on the pin 27 on the disk 3 and engages the gear ring 28 which is stationary, this causes the disk 3 to be revolved, which in turn moves the threaded pin 4 and advances the piston 5 thereon causing it to force the lubricant through the passageway 2 to the part to be lubricated. Since the sleeve 24 has but one tooth, the grease will only be delivered intermittently and this intermittent delivery can be timed by means of the gearing being proportioned to the amount of lubricant required for the particular part to which the cup is attached and also the lubricant can be delivered faster or slower according as the machinery moves faster or slower which will deliver the lubricant in about the proportion required according to the amount of friction. The cover 7 and its connected parts are held stationary on the grease cup by means of hinged straps 29 on the cover 7 which fit over pins 30 on the cup 1 and which can be held therein by cross pins 31. On the portion 6 of the pin 4 is a collar 32 against which the piston drops when it works off of the threaded pin 4, whereby it can be adapted to be again engaged with the threads for reverse movement when it is desired to remove the piston 5 from the cup 1.

In order to prevent the piston 26 from having any backward movement which would raise, rather than lower the piston 5, I provide a spring pressed ratchet 33 mounted on the disk 3 and engaging said piston 26.

From the foregoing description it will be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. A device of the character described comprising the combination with a grease cup, a threaded pin carrying a piston mounted in said grease cup, a disk removably mounted on said pin, a cover on said grease cup, a pin on said disk mounted through the top of said cover, an annular rack on the inside of said cover, a pinion turnably mounted on said disk and engaging said rack, a pinion turnably mounted on said pin on said disk, a sleeve on said last named pinion having a tooth engaging the pinion mounted on said disk, and means for operating the pinion provided with said sleeve, as described.

2. A device of the character described comprising the combination with a grease cup, a threaded pin carrying a piston disposed in said grease cup, a cover carrying gearing adapted to rotate said threaded pin in an intermittent manner, a sleeve on said cover, a pinion in said sleeve adapted to operate said gearing, a pin movable in said sleeve and adapted to turn said pinion, and means for intermittently turning said pin, as described.

3. A device of the character described comprising the combination with a grease cup, a threaded pin carrying a piston disposed in said grease cup, a cover mounted on said grease cup, and provided with a sleeve, a pin disposed in said sleeve, means for moving said pin in said sleeve in a reciprocating manner and intermittently turning the same, a gearing operatively connected between said pin in said sleeve and said threaded pin in said cup, and means for operating said gearing to turn said threaded pin with the intermittent turning movement of said pin in said sleeve, as described.

In testimony whereof I affix my signature in presence of two witnesses.

VICTOR GAZZOLO.

Witnesses:
STEPHEN N. BLEWETT,
CLARENCE M. SMITH.

Copies of this patent may be obtained for five cents each, by addressing the "Commissioner of Patents, Washington, D. C."